(12) United States Patent
Banerjee et al.

(10) Patent No.: US 9,367,407 B2
(45) Date of Patent: Jun. 14, 2016

(54) OPTIMIZING PLACEMENT PLANS FOR HOST FAILURE IN CLOUD COMPUTING ENVIRONMENTS

(71) Applicant: International Business Machines Corporation, Armonk, NY (US)

(72) Inventors: Pradipta K. Banerjee, Bangalore (IN); Ashish Billore, Bangalore (IN); Sudipta Biswas, Bangalore (IN); Muthu A. Muthiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 14/451,475

(22) Filed: Aug. 5, 2014

(65) Prior Publication Data

US 2016/0041889 A1    Feb. 11, 2016

(51) Int. Cl.
*G06F 11/20*    (2006.01)
*G06F 9/48*    (2006.01)
*G06F 9/455*    (2006.01)
*G06F 11/00*    (2006.01)
*G06F 11/30*    (2006.01)

(52) U.S. Cl.
CPC .......... *G06F 11/203* (2013.01); *G06F 9/45558* (2013.01); *G06F 9/4856* (2013.01); *G06F 11/004* (2013.01); *G06F 11/301* (2013.01); *G06F 11/3006* (2013.01); *G06F 2009/4557* (2013.01); *G06F 2201/815* (2013.01)

(58) Field of Classification Search
CPC . G06F 11/20; G06F 11/2023; G06F 11/2035; G06F 11/2043
See application file for complete search history.

(56) References Cited

U.S. PATENT DOCUMENTS

| | | | |
|---|---|---|---|
| 2012/0151474 A1* | 6/2012 | Biran | G06F 9/45558 718/1 |
| 2013/0262915 A1 | 10/2013 | Frank et al. | |
| 2013/0297964 A1 | 11/2013 | Hegdal et al. | |
| 2013/0311622 A1* | 11/2013 | Das Gupta | G06F 9/466 709/221 |
| 2016/0041857 A1 | 2/2016 | Banerjee et al. | |

OTHER PUBLICATIONS

"Optimizing Placement Plans for Host Failure in Cloud Computing Environments", U.S. Appl. No. 14/510,150, filed Oct. 9, 2014.
IBM Appendix P, list of IBM patents or patent applications treated as related, Oct. 9, 2014.

* cited by examiner

*Primary Examiner* — Jigar Patel
(74) *Attorney, Agent, or Firm* — Alexa L. Ashworth

(57) ABSTRACT

Embodiments of the present invention provide systems, methods, and computer program products for optimizing a placement plan. In one embodiment, a method is disclosed in which a request for registration with an external advisor is received. A time to live is received from each external advisor and used to determine an overall timeout period value for a placement engine. After receiving a predictive failure alert, internal and external advisors are ranked according to criteria and advice is received from the qualified advisors. A placement plan is generated based on the advice received from the advisors.

8 Claims, 5 Drawing Sheets

OPTIMIZING PLACEMENT PLANS FOR HOST FAILURE IN CLOUD COMPUTING ENVIRONMENTS

BACKGROUND OF THE INVENTION

The present invention relates generally to the field of resource placement in a cloud computing environment, and more particularly to optimizing a placement plan for a host failure in a cloud computing environment.

A cloud environment is generally composed of a collection of hosts, with virtual machines (VMs) created on top of the hosts. To ensure the cloud environment remains in an optimally balanced state, calculations are performed, often by a placement engine, in order to determine an optimal placement plan for the various components within the cloud environment. The calculations are partially based on received advice, or constraints, from one or more advisors. In response to a failure occurring, some systems may calculate a new placement plan to migrate VMs, partially calculated from the received advice, to account for the host failure. To further ensure the cloud environment continues to run in an optimized state, some systems store a recovery placement plan, which may be accessed at the time of a system failure.

SUMMARY

According to one embodiment of the present invention, a method for optimizing a placement plan is provided, the method comprising: receiving, by one or more processors, a request for registration from an advisor; determining, by one or more processors, an initial timeout period value associated with the advisor; determining, by one or more processors, an overall timeout period value for a placement engine based, at least in part, on the initial timeout period value associated with the advisor and a time to live value received from the advisor; responsive to receiving a predictive failure alert for a first host in a first pool, qualifying the advisor and receiving advice from the advisor; and generating a placement plan for migrating a virtual machine from the first host based, at least in part, on the received advice from the advisor.

DETAILED DESCRIPTION

The amount of time and resources used to create a placement plan are critical to the optimal functioning of a cloud, or virtualized, environment. As multiple constraints from various advisors must be taken into consideration when computing the placement plan and a timeout period is usually required, during which the placement engine waits for the requested advice from the advisors, placement calculations may become resource intensive and time consuming. Embodiments of the present invention provide systems and methods for reducing the complexity of a placement plan calculation by storing the time to live for advice from each advisor and by dynamically qualifying and disqualifying certain advisors, based on the timeout period for each advisor.

Figure 1:
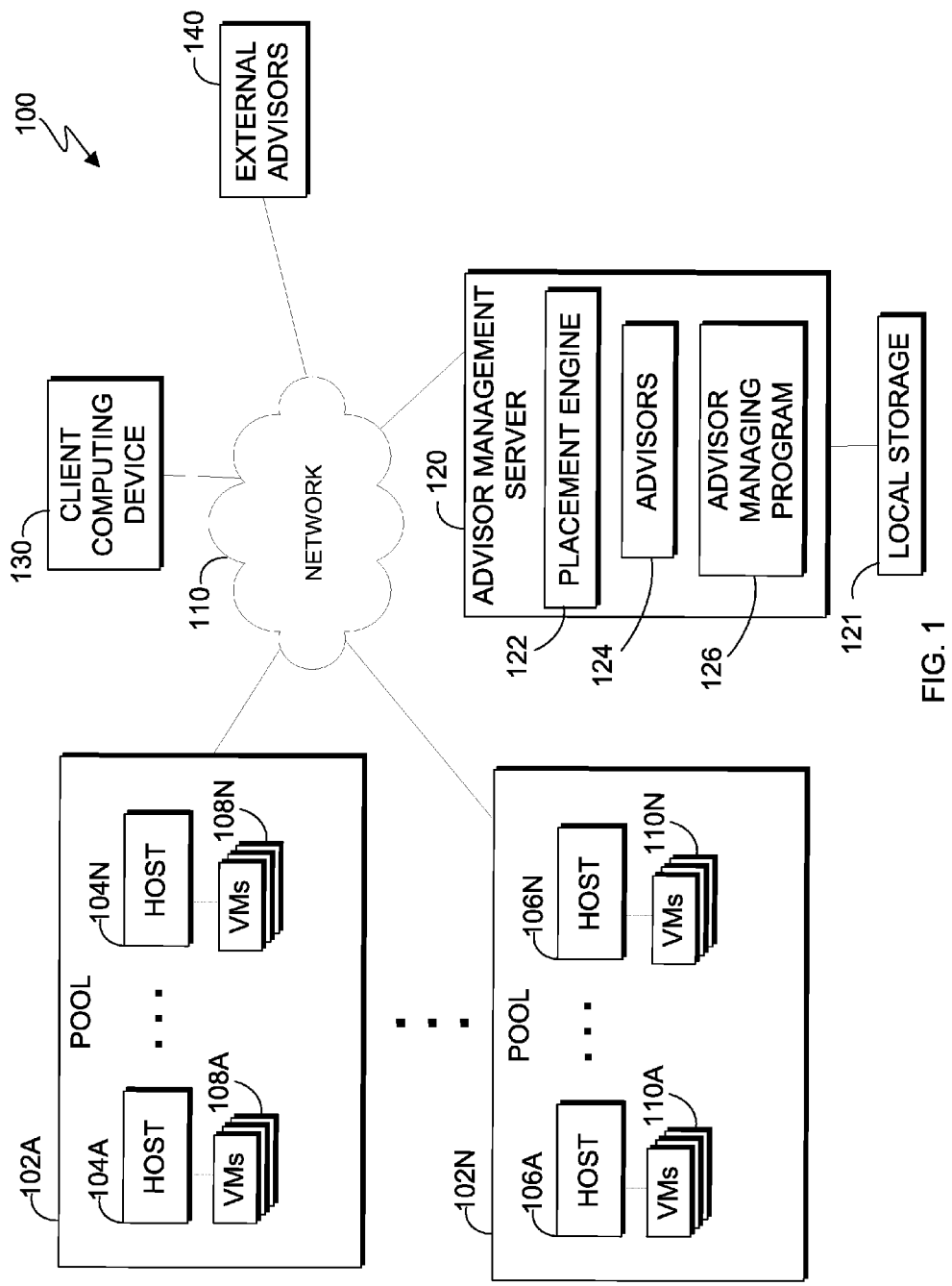
FIG. 1 is a functional block diagram illustrating an environment, in accordance with an embodiment of the present invention.

The present invention will now be described in detail with reference to the Figures. FIG. 1 is a functional block diagram illustrating an environment, generally designated 100, in accordance with one embodiment of the present invention. Modifications to environment 100 may be made by those skilled in the art without departing from the scope of the invention as recited by the claims. In this exemplary embodiment of environment 100, advisor management server 120 is in communication with client computing device 130, external advisors 140, and pool 102A through pool 102N ("102A-N"), via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between client computing device 130, pools 102A-N, external advisors 140, and advisor management server 120.

Client computing device 130 may be a laptop computer, a tablet computer, a netbook computer, a personal computer (PC), a desktop computer, a personal digital assistant (PDA), a smart phone, a thin client, or any programmable electronic device capable of communicating with advisor management server 120 and pools 102A-N, via network 110. Client computing device 130 may include internal and external hardware components, as depicted and described in further detail with respect to FIG. 5.

Pools 102A-N include hosts 104A-N and hosts 106A-N. Each of hosts 104A-N is virtually connected to one or more virtual machines (VMs) 108A (operating on host 104A) through VMs 108N (operating on host 104N), and each of hosts 106A-N is virtually connected to one or more VMs 110A (operating on host 106A) through VMs 110N (operating on host 106N). In this exemplary embodiment, each of pools 102A-N is optimized based on a different goal, for example, energy conservation goals or high performance goals.

Hosts 104A-N and hosts 106A-N in pools 102A-N are capable of communicating with client computing device 130 and advisor management server 120, via network 110. Each of hosts 104A-N and hosts 106A-N may be a management server, a web server, or any other electronic device or computing system capable of receiving and sending data. In this exemplary embodiment of the present invention, hosts 104A-N and hosts 106A-N can represent computing systems utilizing clustered computers and components to act as a single pool of seamless resources when accessed through a network. Hosts 104A-N and hosts 106A-N may include internal and external hardware components, as depicted and described in further detail with respect to FIG. 5.

VMs 108A-N on each of hosts 104A-N, respectively, are each software abstractions of physical computing devices, which execute programs in a manner similar to the execution of programs on a physical computing device. In this exemplary embodiment, each of VMs 108A-N may be migrated to another of hosts 104A-N in pool 102A (i.e., within the same pool), and each of VMs 108A-N may be migrated to one or more of hosts 106A-N in pool 102N (i.e., to a different pool).

Advisor management server 120 includes local storage 121, placement engine 122, advisors 124, and advisor managing program 126. Advisor management server 120 may be a management server, a web server, or any other electronic device or computing system capable of receiving and sending data. Advisor management server 120 is capable of communicating with client computing device 130, pools 102A-N, and external advisors 140, via network 110. Advisor management server 120 may include internal and external hardware components, as depicted and described in further detail with respect to FIG. 5.

Local storage 121 is an information repository for storing data locally on advisor management server 120. In this exemplary embodiment, local storage 121 stores advice received by placement engine 122, from external advisors 140.

In this exemplary embodiment, placement engine 122 registers external advisors 140 and communicates with advisors 124 and external advisors 140 to request periodic advice updates. Placement engine 122 creates a storage space, such as local storage 121, for storing advice from advisors 124 and external advisors 140. Placement engine 122 reconciles conflicting constraints between advisors 124 and external advisors 140, and calculates an optimization plan for a system based on the received advice from advisors 124 and external advisors 140.

In this exemplary embodiment, the advisors which communicate with placement engine 122 are a combination of internal advisors and external advisors. Advisors 124 are internal advisors, coupled with placement engine 122 on advisor management server 120. Advisors 124 are capable of executing advice quickly, as advisors 124 have direct access to the database of advisor management server 120, which is used to calculate a placement plan. Advisors 124 provides placement advice, or constraints, to placement engine 122 related to the respective goals of each type of advisor (i.e., high performance advisor or energy conservation advisor).

External advisors 140 operate outside of the system management software (advisor management server 120). External advisors 140 are available as a service to placement engine 122. External advisors 140 may communicate with placement engine 122, and are capable of being dynamically registered and unregistered and sending advice to placement engine 122. Each advisor type from external advisors 140 and advisors 124 defines a time to live value for the respective advice or constraints. Time to live is the time period for which advice from an advisor will remain valid. The time to live value is specific to each advisor (not to each advice), which reduces the complexity of the system.

Advisor managing program 126 communicates with placement engine 122 to ensure the system remains optimally balanced. Advisor managing program 126 communicates with local storage 121 to remove advice of which the time to live value is expired. Advisor managing program 126 determines a time to live value for each advisor from advisors 124 and external advisors 140. Advisor managing program 126 determines from which advisors to qualify advice, and from which advisors to disqualify advice, during a failure recovery.

Figure 2:
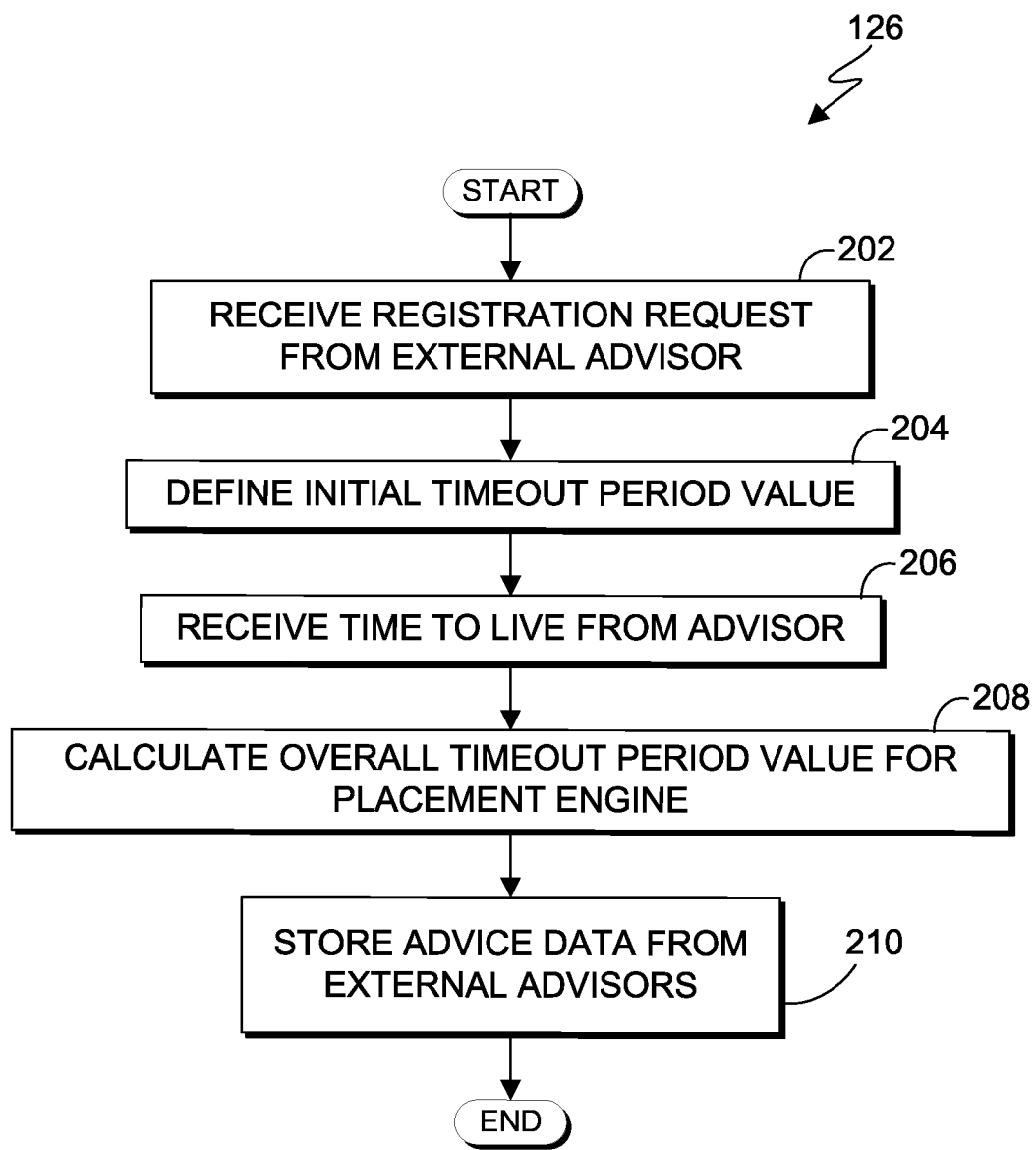
FIG. 2 is a flowchart depicting operational steps for gathering advice data during registration of an advisor with a placement engine, in accordance with an embodiment of the present invention.

FIG. 2 is a flow chart depicting operational steps for gathering advice data during registration of external advisors 140 with placement engine 122, in accordance with an embodiment of the present invention.

In step 202, advisor managing program 126 receives a request from one or more of external advisors 140 to register with placement engine 122. Registration is a process between the placement engine and an external advisor used to authorize and authenticate the external advisor, and to determine future methods of communication between the external advisor and the placement engine.

In step 204, advisor managing program 126 defines an initial timeout period value. In this exemplary embodiment, advisor managing program 126 defines an initial timeout period value for each external advisor of external advisors 140 during the registration of each external advisor. During the registration process, placement engine 122 simulates an advice calculation scenario for each external advisor of external advisors 140, allowing placement engine 122 to gather: the initial approximate times to seek advice from each of external advisors 140; the time for each of external advisors 140 to calculate the advice; and the time taken for each of external advisors 140 to send the advice to placement engine 122. The results of the simulated advice calculation for each of external advisors 140 during the registration process contribute to determining an initial timeout period value for each of external advisors 140. Other factors, such as network latencies and the calculation complexity of each of external advisors 140, also contribute to the initial timeout period value calculation for external advisors 140. In this exemplary embodiment, advisor managing program 126 determines the initial timeout period value using the external advisor from external advisors 140 with the highest initial timeout period value, for purposes of optimizing the overall operation of placement engine 122 when a system contains multiple advisors from external advisors 140 sending advice to placement engine 122.

In step 206, advisor managing program 126 receives a time to live from each of external advisors 140, based on the type of external advisor. Time to live is the time period for which advice from an external advisor is still valid and is unique to each external advisor. For example, constraints which change frequently require frequently updated advice from external advisors 140 as part of the simulated advice calculation scenario, while constraints which do not change frequently do not need frequent updates, reducing the time of execution of placement engine 122. As discussed in greater detail later in this specification, advisor managing program 126 can direct placement engine 122 to seek advice only from those external advisors 140 with expired time to live values (advice is no longer valid and needs to be updated) and bypass seeking advice from those external advisors 140 with valid time to live values, optimizing the execution of placement engine 122.

In step 208, advisor managing program 126 calculates an overall timeout period value for placement engine 122 based on the determined initial timeout period values and time to live values for each of external advisors 140. In this exemplary embodiment, the overall timeout period value for placement engine 122 is the highest initial timeout period value, from all of the initial timeout period values calculated for each external advisor of external advisors 140, for which the advice from the external advisor has expired (time to live value has expired). The external advisors of external advisors 140 with valid advice (time to live has not expired) will be bypassed until advisor managing program 126 identifies an external advisor of external advisors 140 which has expired advice, reducing the overall complexity of calculations by placement engine 122. For example, a system with three external advisors within external advisors 140, advisor 1, advisor 2, and advisor 3, associated with initial timeout period values, time 1, time 2, and time 3, respectively, where time 1>time 2>time 3, has an overall timeout period value for placement engine 122 equal to time 1 (the highest initial timeout period value). In the same example, if the time to live value of advisor 1 has not expired (advice is still valid), then advisor 1 is bypassed, and the overall timeout period value for placement engine 122 is determined by the next highest initial timeout period value, time 2 (associated with advisor 2).

In step 210, advisor managing program 126 stores the advice data received from external advisors 140. In this exemplary embodiment, advisor managing program 126 creates a storage space for storing the advice data of each external advisor of external advisors 140 in an offline cache (local storage 121). The storage for the advice may be in a shared database or in the memory, dependent on the amount of advice data sent by external advisors 140. In this exemplary embodiment, advisor managing program 126 requests updated advice data from each of external advisors 140 at time intervals defined by a user. In other embodiments, advisor management program 126 requests updated advice data from each of external advisors 140 at time intervals determined by the optimization goals of the system. In this exemplary embodiment, the time to live associated with the advice is used to keep the offline cache updated. For example, all advice which has an expired time to live value is cleaned out of the offline cache, and updated advice from external advisors 140 is requested by placement engine 122, while advice which has a valid time to live value remains in the offline cache.

Accordingly, by performing the operational steps of FIG. 2, placement engine 122 receives and stores advice from external advisors 140 in an optimized and accurate way. Furthermore, the overall complexity of calculations performed by placement engine 122 is reduced by computing an overall timeout period value during registration and storing the time to live values associated with each advisor.

Figure 3:
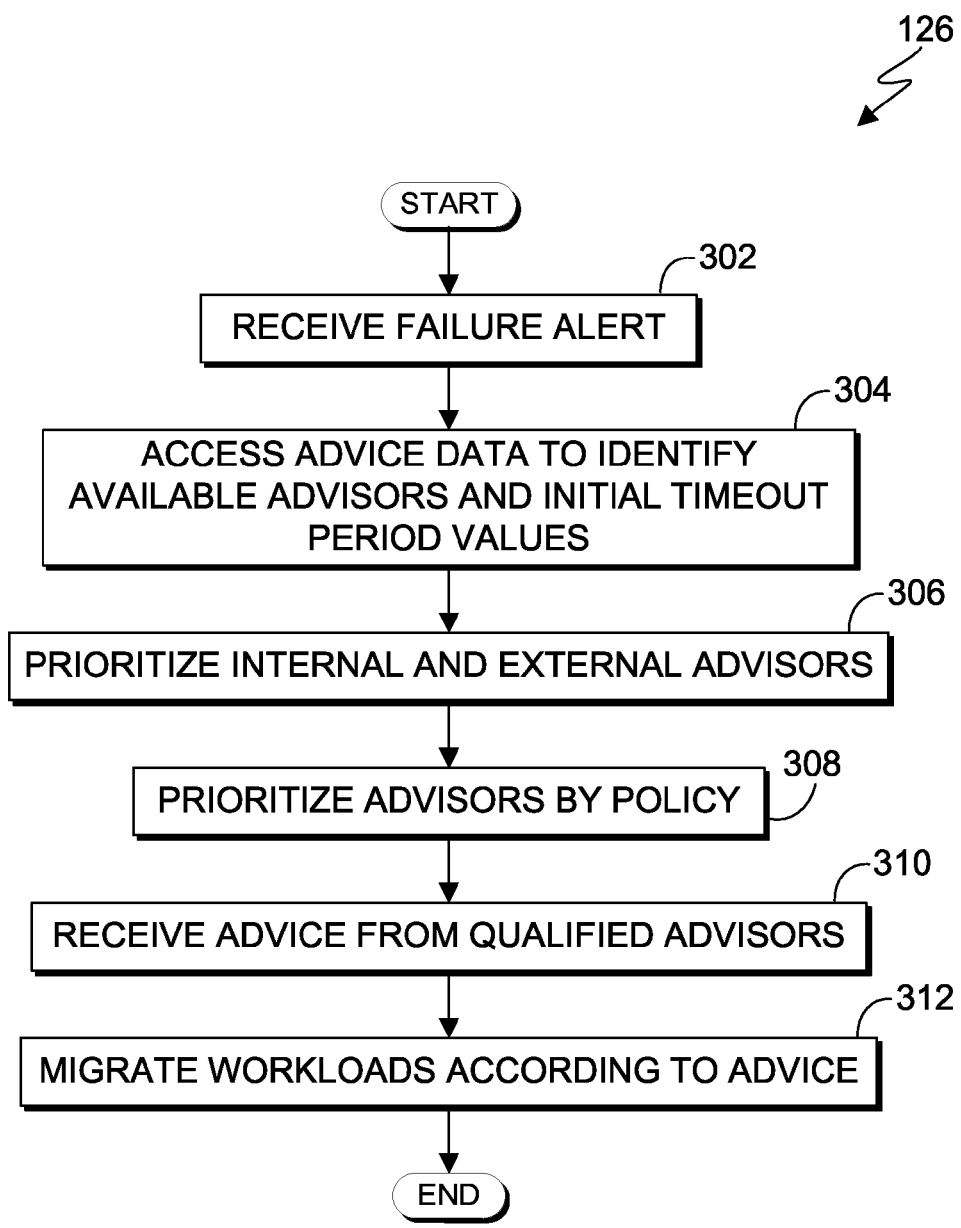
FIG. 3 is a flowchart depicting operational steps for dynamically qualifying and disqualifying advisors based on criteria during a received failure, in accordance with an embodiment of the present invention.

FIG. 3 is a flowchart depicting operational steps for dynamically qualifying and disqualifying advisors based on criteria during a received failure, in accordance with an embodiment of the present invention.

In step 302, advisor managing program 126 receives a predictive failure alert through a monitoring infrastructure within the cloud environment. A predictive failure alert (PFA) is an indication of an impending failure of a system component. PFAs may be distinguished based on the type of failure; for example, a failure alert may indicate a hardware failure, performance bottleneck, a server error, or other component malfunctions. When a failure is detected, the reaction window is the time period for which placement engine 122 must prepare an optimized failure recovery plan. The reaction window may be different dependent on the type of failure alert that is received by placement engine 122. A map is formed and stored in the local storage of placement engine 122, which tracks the initial values of each type of failure alert, along with the corresponding reaction time. In this exemplary embodiment, the reaction window is a fixed value at the beginning of recovery plan calculations and is continually optimized by placement engine 122 to a more accurate value using heuristics (experience-based) calculations, derived from stored information about the type of failure detected and knowledge of past events.

In step 304, advisor managing program 126 accesses the advice data to identify the available external advisors of external advisors 140 and to identify the determined initial timeout period values of each of external advisors 140. The available external advisors of external advisors 140 are those external advisors which have registered with placement engine 122, and advisor managing program 126 has determined an initial timeout period value associated with each external advisor during registration. Advisor managing program 126 considers each external advisor of external advisors 140, and which external advisors may be excluded (discussed below), to improve on the efficiency of creating a recovery plan in response to a system failure.

In step 306, advisor managing program 126 prioritizes the available advisors, from advisors 124 and external advisors 140, from which to seek advice. In this exemplary embodiment, advisor managing program 126 determines which constraints to follow from each advisor (qualified advisors), and which advisors to disqualify from sending advice, by prioritizing the available advisors, from advisors 124 and external advisors 140. Advisor managing program 126 causes placement engine 122 to initially bypass seeking advice from external advisors 140 (which take longer to receive advice, as they are outside of the management software). After an initial value for the reaction window has been defined, advisor managing program 126 instructs placement engine 122 to seek advice from all advisors (advisors 124 and external advisors 140) which have an initial timeout period value that is less than the determined initial reaction window value.

In step 308, advisor managing program 126 prioritizes the available advisors from advisors 124 and external advisors 140 by policy, to further determine the set of advisors to qualify (receive advice from) and disqualify (do not consider the advice from) during a disaster recovery plan calculation. In this exemplary embodiment, advisor managing program 126 provides a rank or a priority weighting to each of the advisors from advisors 124 and external advisors 140 based on the advisor policy or goal. For example, an advisor with a high performance goal may be prioritized above an advisor with an energy conservation goal. When there are two or more advisors with conflicting advice or constraints, the ranking assigned to the advisors is used to resolve the conflicting constraints, so that the calculated recovery plan adheres to as many of the received advisor constraints as possible.

In step 310, advisor managing program 126 receives advice from the determined qualified advisors. In this exemplary embodiment, advisor managing program 126 receives a set of advice, merged from all advice or constraints, sent by each determined qualified advisor from advisors 124 and external advisors 140. For example, advisor managing program 126 may qualify two advisors with initial timeout period values which are lower values than the determined reaction window value, while disqualifying three advisors from sending advice with initial timeout period values which are higher than the determined reaction window value. In this exemplary embodiment, advisor managing program 126 uses local storage 121 during a failure recovery to store the advice which still has a valid time to live.

In step 312, advisor managing program 126 migrates the workloads according to the calculated failure recovery plan, using the set of advice from the determined qualified advisors. In this exemplary embodiment, advisor managing program 126 receives the recovery plan calculations and the constraints from qualified advisors 124 and external advisors 140, and computes an optimized plan for migrating VMs from failing hosts to properly functioning hosts within the system pool.

Accordingly, advisor managing program 126 may qualify or disqualify each advisor based on the initial timeout period values and whether the advisors are internal or external is achieved, increasing the efficiency of the placement engine during a disaster recovery plan calculation.

Figure 4:
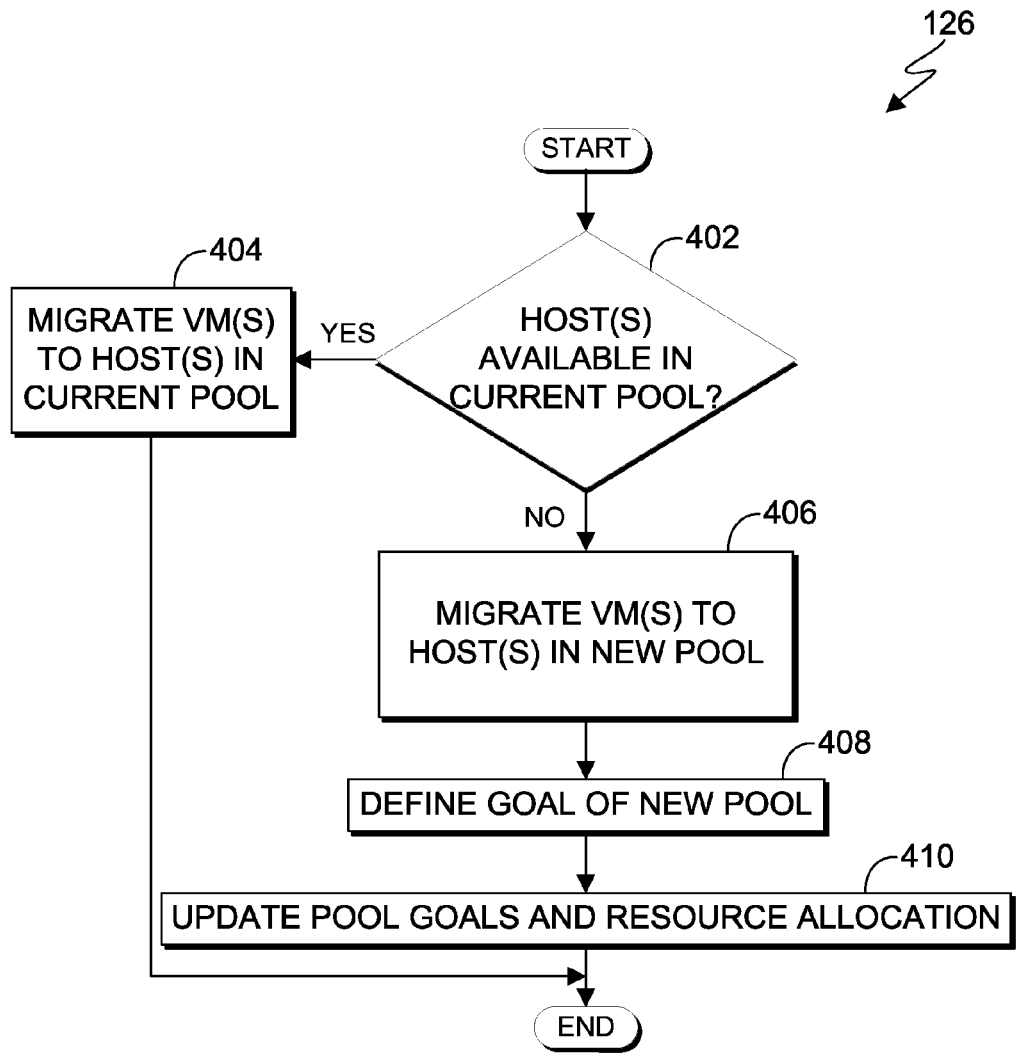
FIG. 4 is a flowchart depicting operational steps for migrating virtual machines to different hosts during failure recovery, in accordance with an embodiment of the present invention.

FIG. 4 is a flowchart depicting operational steps for migrating virtual machines to different hosts during failure recovery, in accordance with an embodiment of the present invention.

In step 402, advisor managing program 126 determines whether there are available host(s) in the same pool as the failing host(s), to which the VMs associated with the failing host(s) may be migrated. For example, advisor managing program 126 may determine whether there is an available host in pool 102A, when host 104A is a failing host. In this exemplary embodiment, migrating VMs from failing hosts to new, functioning hosts within the same system pool is preferred, as each system pool has a unique optimization goal (i.e., performance or energy conservation), and a migration to a new host within the same pool does not change the overall pool optimization goal.

If, in step 402, advisor managing program 126 determines that there are available host(s) in the same pool as the failing host(s) to which the VMs associated with the failing host(s) may be migrated, then, in step 404, advisor managing program 126 migrates the VMs from the failing host(s) to the available host(s) in the same pool. For example, advisor managing program 126 may determine that host 104N is an available host in the same pool, pool 102A, as failing host 104A, to which VMs 108A may be migrated.

If, in step 402, advisor managing program 126 determines that there are not available host(s) in the same pool as the failing host(s) to which the VMs associated with the failing host(s) may be migrated, then, in step 406, advisor managing program 126 migrates the VMs from the failing host(s) to available host(s) in a new pool. For example, advisor managing program 126 may determine that there are no available hosts in pool 102A to which VMs 108A, associated with failing host 104A, may be migrated. In this exemplary embodiment, advisor managing program 126 first determines there are a sufficient number of available host(s) in the new pool before migrating the VMs associated with the failing host(s) of the original pool. In other embodiments, advisor managing program 126 migrates VMs from failing host(s) to new host(s), which are not a member of any pool (i.e., spare hosts).

In step 408, advisor managing program 126 defines the optimization goal of the new pool. In this exemplary embodiment, the advisors in each system pool are optimally ranked based on the requirements of the pool. For example, pool 102A may have a goal of energy conservation as the primary criteria for optimization, and contains energy advisors which are prioritized over other types of advisors. In this exemplary embodiment, the ranking of the advisors in each system pool changes based on the property changes of the system pool. For example, the ranking of the advisors and goals of pool 102N changes when migrating VMs 108A from host 104A within pool 102A, which has a goal of energy conservation, to host 106A within pool 102N, which has a goal of high performance.

In step 410, advisor managing program 126 updates the new system pool to reflect the changed goals and resource allocations. In this exemplary embodiment, placement engine 122 is capable of copying the rankings from pool 102A to pool 102N, in order to change the optimization goals of pool 102N. Prior to changing the optimization goals of a system pool, the workload priority is evaluated by measuring the customer needs as a priority before the workload needs. In this exemplary embodiment, the optimization goals of a system pool are adjusted only when a high priority workload is migrated to a new system pool.

Figure 5:
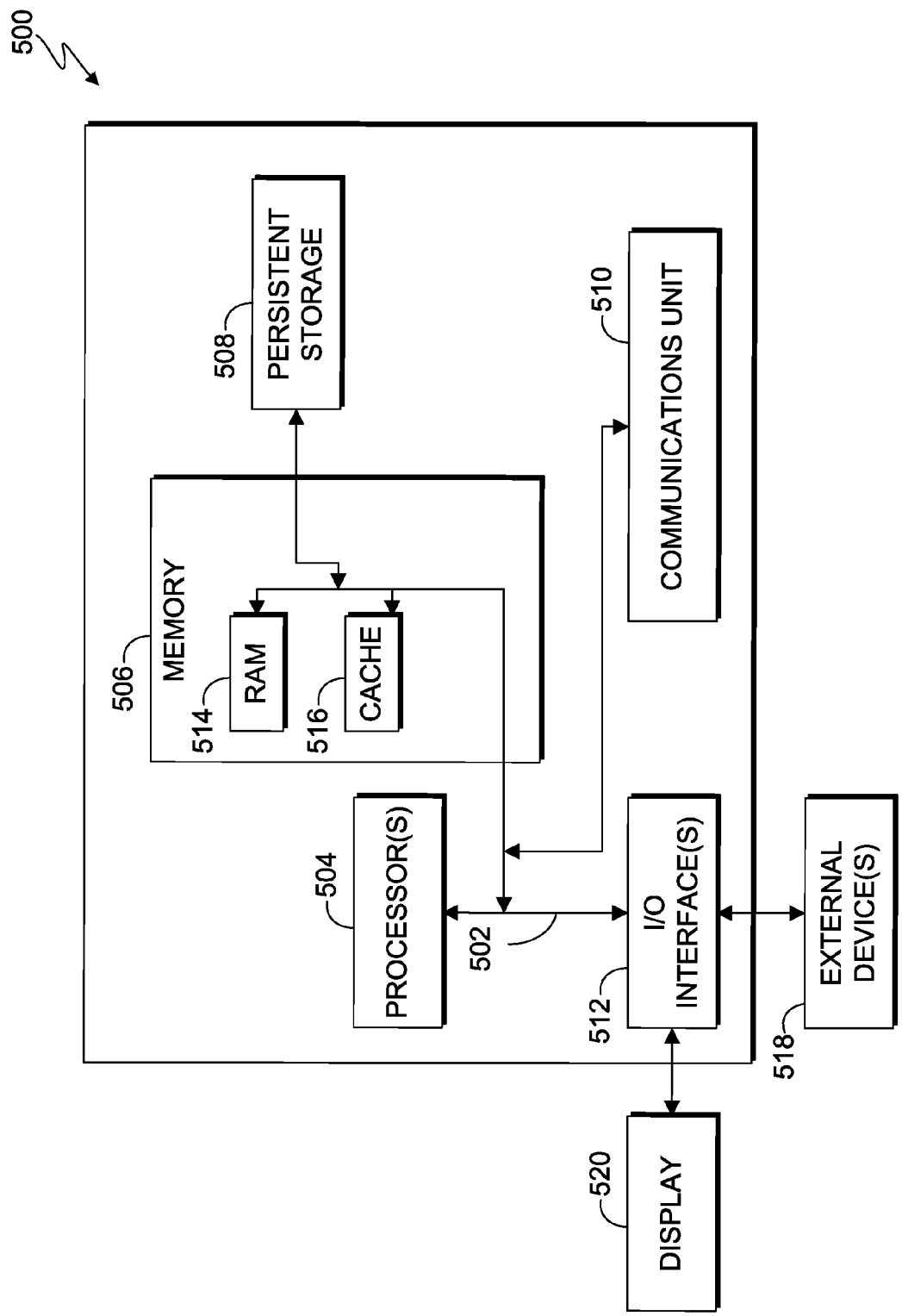
FIG. 5 depicts a block diagram of internal and external components of a data processing system, such as the client computing device of FIG. 1, in accordance with an embodiment of the present invention.

FIG. 5 depicts a block diagram of components of advisor management server 120, client computing device 130, hosts 104A-N, and hosts 106A-N, in accordance with an illustrative embodiment of the present invention. It should be appreciated that FIG. 5 provides only an illustration of one implementation, and does not imply any limitations with regard to the environments in which different embodiments may be implemented. Many modifications to the depicted environment may be made.

Advisor management server 120, client computing device 130, hosts 104A-N, and hosts 106A-N each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

The programs advisor managing program 126 in advisor management server 120 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including between advisor management server 120, client computing device 130, hosts 104A-N, and hosts 106A-N. In these examples, communications unit 510 includes one or more network interface cards. Communications unit 510 may provide communications through the use of either or both physical and wireless communications links. The programs advisor managing program 126 in advisor management server 120 may be downloaded to persistent storage 508 through communications unit 510.

I/O interface(s) 512 allows for input and output of data with other devices that may be connected to advisor management server 120, client computing device 130, hosts 104A-N, and host 106A-N. For example, I/O interface 512 may provide a connection to external devices 518, such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the programs advisor managing program 126 in advisor management server 120, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for optimizing a placement plan, the computer program product comprising:
    a computer readable storage medium and program instructions stored on the computer readable storage medium, the program instructions comprising:
        program instructions to receive a request for registration from an advisor;
        program instructions to determine an initial timeout period value associated with the advisor;
        program instructions to determine an overall timeout period value for a placement engine based, at least in part, on the initial timeout period value associated with the advisor and a time to live value received from the advisor;
        program instructions to, responsive to receiving a predictive failure alert for a first host in a first pool, qualify the advisor and receive advice from the advisor, wherein the program instructions to qualify the advisor comprise: program instructions to prioritize the advisor based, at least in part, on the initial timeout period value associated with the advisor, a policy type of the advisor, and whether the advisor is an internal or external advisor; and
        program instructions to generate a placement plan for migrating a virtual machine from the first host based, at least in part, on the received advice from the advisor.

2. The computer program product of claim 1, wherein the program instructions to generate a placement plan for migrating a virtual machine from the first host based, at least in part, on the received advice from the advisor comprise:
    program instructions to determine whether there is an available host in the first pool to which to migrate the virtual machine;
    program instructions to, responsive to determining that there is an available host in the first pool to which to migrate the virtual machine, generate a placement plan that instructs a placement engine to migrate the virtual machine to the available host in the first pool; and
    program instructions to, responsive to determining that there is not an available host in the first pool to which to migrate the virtual machine, generate a placement plan that instructs the placement engine to migrate the virtual machine to an available host in a second pool.

3. The computer program product of claim 2, further comprising:
    program instructions to, responsive to migrating the virtual machine to the available host in the second pool, update an optimization goal of the second pool, based on a first optimization goal of the first pool and a second optimization goal of the second pool.

4. The computer program product of claim 1, further comprising:
    program instructions to store advice data, wherein the advice data comprises the received advice from the advisor and the time to live value received from the advisor; and
    program instructions to, responsive to identifying advice with an expired time to live value at a predetermined time interval, remove the advice with the expired time to live value at the predetermined time interval.

5. A computer system for optimizing a placement plan, the computer system comprising:
    one or more computer processors;
    one or more computer readable storage media;
    program instructions stored on the one or more computer readable storage media for execution by at least one of the one or more processors, the program instructions comprising:
        program instructions to receive a request for registration from an advisor;
        program instructions to determine an initial timeout period value associated with the advisor;
        program instructions to determine an overall timeout period value for a placement engine based, at least in part, on the initial timeout period value associated with the advisor and a time to live value received from the advisor;
        program instructions to, responsive to receiving a predictive failure alert for a first host in a first pool, qualify the advisor and receive advice from the advisor; wherein the program instructions to qualify the advisor comprise: program instructions to prioritize the advisor based, at least in part, on the initial timeout period value associated with the advisor, a policy type of the advisor, and whether the advisor is an internal or external advisor; and
        program instructions to generate a placement plan for migrating a virtual machine from the first host based, at least in part, on the received advice from the advisor.

6. The computer system of claim 5, wherein the program instructions to generate a placement plan for migrating a virtual machine from the first host based, at least in part, on the received advice from the advisor comprise:
    program instructions to determine whether there is an available host in the first pool to which to migrate the virtual machine;
    program instructions to, responsive to determining that there is an available host in the first pool to which to migrate the virtual machine, generate a placement plan that instructs a placement engine to migrate the virtual machine to the available host in the first pool; and
    program instructions to, responsive to determining that there is not an available host in the first pool to which to migrate the virtual machine, generate a placement plan that instructs the placement engine to migrate the virtual machine to an available host in a second pool.

7. The computer system of claim 6, further comprising:
    program instructions to, responsive to migrating the virtual machine to the available host in the second pool, update an optimization goal of the second pool, based on a first optimization goal of the first pool and a second optimization goal of the second pool.

8. The computer system of claim 5, further comprising:
    program instructions to store advice data, wherein the advice data comprises the received advice from the advisor and the time to live value received from the advisor; and
    program instructions to, responsive to identifying advice with an expired time to live value at a predetermined time interval, remove the advice with the expired time to live value at the predetermined time interval.

* * * * *